United States Patent Office 3,798,249
Patented Mar. 19, 1974

3,798,249
CATALYST SYSTEM FOR THE POLYMERIZATION
OF EPOXIDES
Henricus G. J. Overmars, Zeist, and Jan G. Noltes, Huis ter Heide, Netherlands, assignors to International Lead Zinc Research Organization, Inc., New York, N.Y.
No Drawing. Filed June 23, 1971, Ser. No. 156,027
Claims priority, application Netherlands, July 2, 1970, 7009841
Int. Cl. C07f 3/06, 7/22, 7/24
U.S. Cl. 260—429.9   11 Claims

ABSTRACT OF THE DISCLOSURE

A catalyst system for polymerizing epoxides which comprises a complex formed by reacting (a) a diorganozinc compound having the formula RZnR', wherein R represents a substituted or unsubstituted alkyl radical having from 1 to 6 carbon atoms or a substituted or unsubstituted aryl radical having from 6 to 8 carbon atoms and R' is the same as R or an alkoxy, aryloxy or diarylamine radical and (b) a triorganometal thiolate compound having the formula

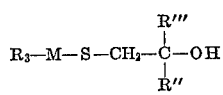

wherein R has the same meaning as above and R" and R''' are selected from the group of radicals including hydrogen, methyl, hydroxymethyl, chloromethyl, the alkyl radicals $(CH_2)_n$—$CH_3$ in which $n$ may be 1 to 16, and substituted and unsubstituted phenyl, and M is the metal silicon, germanium, tin or lead. The polymerization process using relatively small amounts of this catalyst system gives excellent yields of polymers with high crystallinity.

---

The present invention relates to a novel catalyst system, to a method for preparing it and to a method for the polymerization and copolymerization of epoxides using such a catalyst system. More particularly, this invention relates to a complex catalyst formed by reacting a diorganozinc compound and a triorganometal thiolate compound and to the preparation of highly crystalline polyethers from epoxide monomers.

It is well known that high molecular weight polymers and copolymers of epoxides may be prepared using a dialkyl- or diarylzinc compound as the catalyst. The use of diorganozinc compounds as sole catalytic agents for preparing epoxide polymers has a serious drawback in that high catalyst concentrations are required, the reaction times are too long, and further in that high reaction temperatures must be maintained. From a commercial viewpoint, a diorganozinc catalyst by itself is unsatisfactory for polymerizing epoxide monomers since relatively large amounts of it are required to complete the reactions which at best give low yields of crystalline products.

It has now been found that excellent yields of 1,2 epoxide polymers having high crystallinity and also copolymers can be prepared in a relatively short time at low temperatures using small amounts of catalyst. This may be accomplished by catalyzing epoxide polymerization reactions with a complex compound formed by the interaction of a diorganozinc compound and a triorganometal thiolate compound.

According to the invention, epoxide monomers and mixtures thereof are polymerized or copolymerized in the presence of a catalyst system comprising a complex chemical structure formed by reacting (a) a diorganozinc compound of the formula RZnR' wherein R represents an unsubstituted or substituted alkyl radical having from 1 to 6 carbon atoms or an unsubstituted or substituted aryl radical having 6 to 8 carbon atoms and R' is the same as R or an alkoxy, aryloxy or diarylamine radical; and (b) a triorganometal thiolate compound of the general formula

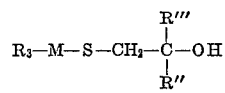

wherein R has the same meaning as above and R" and R''' are each chosen from the group of radicals consisting of hydrogen, methyl, hydroxymethyl, chloromethyl, the alkyl radicals —$(CH_2)_n$—$CH_3$ in which $n$ may be 1 to 16, and substituted and unsubstituted phenyl, and M is a metal selected from the group consisting of silicon, germanium, tin and lead. In the preceding definitions of the reactants for the catalyst system, the substituents for the aryl and alkyl radicals must be those which do not interfere with the polymerization reaction mechanism.

As far as metal M in the thiolate reactant is concerned, tin and lead are preferred to silicon or germanium because the polymerization time is considerably shorter with tin and lead.

The catalytic complex may be prepared by mixing the diorganozinc and triorganometal thiolate compounds, as previously defined, in approximately equivalent amounts of an inert, non-polar solvent and causing them to react in an inert dry atmosphere at a temperature between 0° C. and 120° C., preferably between 60° C. and 100° C. The equivalence of the thiolate compound is calculated on the amount of hydroxy groups present. In this regard, there should be approximately one hydroxy group per zinc atom. While the ratio of zinc to hydroxy radical is preferably 1:1, this ratio may be chosen between 1:1 and 1:2. The thiolate compound can also be prepared in the polymerization vessel from a triorganometal hydroxide having the formula $R_3MOH$ wherein R and M have the same meaning as above and a suitable mercapto (—SH) compound. The diorganozinc compound is then added to this reaction mixture after removal of the reaction water by azeotropic distillation. The mercapto compounds used to prepare the triorganometal thiolate compound may themselves be prepared from a suitable epoxide and $H_2S$.

The catalyst, which is precipitated from the diorganozinc-thiolate reaction mixture, may be isolated by centrifuging or filtering and drying with exclusion of air and moisture. The dried product is highly active and must be stored in an inert environment. Under certain conditions, the non-filtered reaction product can be used. The liquid reaction mixture containing the catalytic complex can also be evaporated to dryness in vacuum, if necessary at raised temperature, without any adverse effect on the activity of the catalyst.

According to one embodiment of the present invention, highly crystalline polymers are prepared by premixing the diorganozinc and the triorganometal thiolate compounds previously described in an inert, non-polar solvent and reacting them at a temperature ranging from 0° C. to 120° C. to form the catalyst. The epoxide monomer is then polymerized in the presence of the complex catalyst system at a temperature ranging from 0° C. to 250° C. in an inert, dry atmosphere to form the polymer. This method may also be used with mixtures of the different epoxide monomers to form the desired copolymers.

Various epoxides can be polymerized or copolymerized with this catalyst including alkylene oxides. Examples are ethylene oxide, propylene oxide, 1,2-butylene oxide, 2,3-butylene oxide, 1,2-butadiene monoxide, 1,2-cyclohexene oxide, 1,4-cyclohexene oxide, 1,2-dodecylene oxide, vinylcyclohexene oxide, styrene oxide, phenylglycidyl ether, allylglycidyl ether, butylglycidyl ether and the like. Mixtures of these epoxides may be used to obtain copolymers.

The polymerization or copolymerization with the aid of the above-mentioned catalyst system may be carried out in the presence of a hydrocarbon solvent. Suitable solvents include aromatic hydrocarbons, such as benzene, toluene and xylene, alicyclic hydrocarbons, such as cyclohexane and Decalin, aliphatic hydrocarbons, such as pentane, hexane and nonane, and chlorinated hydrocarbons, such as carbon tetrachloride and dichloroethane. Kerosine (B.P. 150–250° C.) is also a suitable solvent. The polymerization or copolymerization reaction can also be executed in the absence of a solvent, but it is then difficult to control the violent exothermic reaction which occurs. The amount of solvent necessary is determined by the monomer or monomers to be polymerized and the nature of the polymer formed. When benzene is used as the solvent, in the case of propylene oxide a solid gel mass is obtained at, for instance, a 1:1 volume ratio of solvent to epoxide. It is also possible to polymerize this monomer in hexane or kerosine at a 10:1 or higher volume ratio of solvent to epoxide and a flaky precipitate is obtained which can easily be filtered.

The catalyst itself can be applied in amounts of 0.05 to 5 mol percent, preferably approximately 0.1–0.2 mol percent, calculated on the amount of monomer or monomers reacted.

The temperature at which the polymerization can be carried out may vary from 0° C.–250° C., but preferably is carried out between 25° C. and 40° C. The temperature for the reaction depends to a certain extent on the monomer to be polymerized and precautions have to be taken to remove the heat of reaction efficiently.

The usual reaction time is a few hours. The reaction time, however, is governed by the reaction conditions, polymerization or copolymerization may be allowed to proceed either quite rapidly in minutes or rather slowly over a period of several days.

The polymerization process can be carried out in an autoclave in a nitrogen atmosphere and external cooling is necessary.

The polymerization can be carried out continuously in thin layers or as a film. If the reaction is continuous, adequate mixing with the catalyst is a necessary condition.

If necessary, a small amount of antioxidant may be added after polymerization. Suitable antioxidants are 4,4'-thiobis(6-tertbutyl)-m-cresol (Santonox), 2,6-ditertbutyl-p-cresol, phenothiazine, N-phenyl-2-naphthylamine; 1,3,5-trimethyl-1,4,6-tris(3,5-ditertbutyl-4-hydroxy benzyl)benzene (Ionox 330) in an amount of approximately 0.1%.

Certain polymers obtained from propylene oxide according to the invention may be approximately 90% crystalline determined by precipitation from cold acetone. Some polymers obtained have molecular weights up to above 3,000,000. These materials behave like thermoplastic elastomers, that is, they can repeatedly be re-shaped at temperatures above the melting point. After cooling, the mechanical properties, as the low E-modulus and the high elasticity, resemble those of vulcanized rubbers. Films made by melting these polymer products between heated plates under high pressure display a cold elongation of approximately 400%. Upon heating these stretched films at 50° C. to 60° C., their original lengths are obtained again so that they are particularly useful as shrink films. The polymers can also be dissolved in solvents suitable for the purpose and poured out into thin layer coatings. Then upon evaporation of the solvent a strong elastic film is obtained.

The invention will now be described in greater detail with reference to the following examples. These examples are intended only to be illustrative and are not meant to limit the scope of the invention in any way.

EXAMPLE I 15.5 g. of [(2-hydroxyethyl)thio] triphenyllead (Ph$_3$Pb—S—CH$_2$—CH$_2$—OH) was heated with 3.7 g. of diethylzinc for one hour at 80° C. under the exclusion of air in a dry reaction vessel in 200 ml. of benzene in a nitrogen atmosphere. After cooling, the precipitate was filtered under nitrogen, washed with benzene and dried in vacuum. The catalyst thus obtained was stored under exclusion of air and moisture.

0.8 g. of catalyst was mixed with 100 g. of propylene oxide under nitrogen in a dry reaction vessel and the mixture was kept at ambient temperature initially. After 60 minutes a gel block had been produced, the temperature in the block rising to 40°–50° C. After standing overnight at ambient temperature, unconverted monomer was removed by application of reduced pressure. 78 g. of a white rubbery polymer were obtained. The molecular weight was determined viscosimetrically (0.05% solution in benzene at 25° C.) and calculated at $2.5 \times 10^6$.

The polymer's crystallinity, determined by recrystallization of a 1% solution in acetone at —25° C. was approximately 60%. The infrared spectrum of the polymer showed very sharp absorption maxima at 932, 10.38, 1138, 1250, 1330 and 1482 cm.$^{-1}$, which also points to a high crystallinity.

EXAMPLE II 193 mg. of [(2-hydroxyethyl)thio] triphenyllead and 46 mg. of diethylzinc were heated under nitrogen for 1 hour at 80° C. in 5 ml. of benzene. After cooling the reaction product was centrifuged and the upper benzene layer was removed under exclusion of air and water. The precipitate was washed twice with dry carbon tetrachloride and finally taken up in 10 ml. of carbon tetrachloride. After transferring it into a dry polymerization vessel in a nitrogen atmosphere 10.5 ml. (8.7 g.) of propylene oxide was added. After 1 hour a polymer block had been produced. After adding 5 ml. of methanol to which as an antioxidant 50 mg. of 4,4'-thiobis(6-tertbutyl-m-cresol) had been added, all solvents were removed in vacuum. 8.1 g. (93% yield) of a white rubbery polymer with a molecular weight of $3.5 \times 10^6$ resulted. The crystallinity was 80% determined by recrystallizing a 1% solution in isopropyl alcohol at 20° C.

EXAMPLE III

In a dry polymerization vessel filled with nitrogen 1.9 g. of [(2-hydroxyethyl)thio] triphenyllead was dissolved in 22.5 ml. of benzene whereafter a solution of 0.46 g. of diethylzinc in 7.5 ml. of benzene was added with the aid of an injection syringe. Then the reaction mixture was heated for 1 hour at 80°–90° C., while being stirred. A white precipitate was produced. After cooling, 75 ml. of benzene and 105 ml. (87 g.) of propylene oxide were added and the reaction mixture was heated at 25° C. After approximately 5 minutes, the suspension started to gelate whereafter the temperature increased rapidly. By cooling the temperature was kept at approximately 50° C. Finally, heating was continued for some hours at 45° C. After cooling the gel block was dissolved in acetone, to which an antioxidant had been added and the polymer was precipitated with water, 87 g. of polypropylene oxide being obtained, having a molecular weight of $2.5 \times 10^6$. The crystallinity was approximately 60%. From the polymer at 120° C., foils could be pressed, which at ambient temperature were stretchable to 400%. These very strong, stretched films regained their original size upon heating at 50°–60° C.

EXAMPLE IV 320 mg. of [(2-hydroxyethyl)thio] triphenyltin and 164 mg. of diphenylzinc were heated for 1 hour at 80° C. in 6 ml. of benzene in a dry reaction vessel in a nitrogen atmosphere. After cooling, 10.7 ml. (8.7 g.) of propylene oxide was added. After 45 minutes, a gel block had been produced. After some hours the solvent was removed in vacuum and a white rubbery polymer resulted. The yield was close to 100%. The molecular weight amounted to $3.5 \times 10^6$ and the crystallinity was 74%.

EXAMPLE V 185 mg. of diethylzinc in 3 ml. of benzene and 773 mg. of [(2-hydroxyethyl)thio] triphenyllead dissolved in 17 ml. of toluene were brought together and heated for 1 hour at 80° C. After cooling, centrifuging was carried out under nitrogen, the precipitate was suspended in 20 ml. of hexane and centrifuged again. After suspending in 20 ml. of hexane, the suspension was transferred into a dry polymerization vessel whereupon, in a nitrogen atmosphere, 33 ml. of 1,2 butylene oxide (27.6 g.) was added. The reaction mixture had completely gelated after 10 minutes whereupon the temperature rose to approximately 50° C. After some hours, the solvent was evaporated in vacuum. A white rubbery product was obtained in a yield of 96%.

EXAMPLE VI

In a dry reaction vessel filled with nitrogen 139 mg. of diethylzinc and 580 mg. of [(2-yhdrxoyethyl)thio] triphenyllead in 15 ml. of benzene were heated for 1 hour at 80° C. After cooling, the precipitate formed was centrifuged off in nitrogen, washed with benzene and, after centrifuging again, taken up in 15 ml. of benzene in which 31 ml. (34 g.) of phenylglycidyl ether had been dissolved. While being stirred, the reaction mixture was heated for some hours at 80° C., a gel block being produced. After cooling, 5 ml. of methanol was added in which 50 mg. of an antioxidant had been dissolved. After mixing thoroughly the solvents were distilled away in vacuum. 8.2 g. of a white polymer resulted. The rough product was extracted with ether and was found to consist of a polyether with a melting range of 196°–206° C., which was insoluble in ether.

EXAMPLE VII 409 mg. of [(2,3-dihydroxypropyl)thio] triphenyllead ($Ph_3Pb$—S—$CH_2$—CHOH—$CH_2OH$) and 329 mg. of diphenylzinc were heated for 30 minutes at 80° C. in 5 ml. of benzene in a dry reaction vessel filled with nitrogen, while being stirred with a magnetic stirrer. After cooling, 10.5 ml. (8.7 g.) of propylene oxide was added and the reaction mixture was stored overnight at ambient temperature. The polymer formed was dissolved in acetone to which 50 mg. of antioxidant had been added and precipitated by pouring out into water while being stirred vigorously. 9.2 g. of a flaky white rubber was produced, having a molecular weight of $2.2 \times 10^6$. The crystallinity was approximately 30%.

EXAMPLE VIII 387 mg. of [(2-hydroxyethyl)thio] triphenyllead was heated with 93 mg. of diethylzinc for 1 hour at 80° C. in 10 ml. of benzene as described in the preceding examples. With this catalyst system copolymerizations of epoxides were carried out. The results are summarized in Table 1.

TABLE 1.—COPOLYMERIZATIONS OF EPOXIDES

| Exp. No. | Monomer[1] A | B | Molar ratio | Polymerization conditions | Yield, percent | Properties |
|---|---|---|---|---|---|---|
| a | PO | PGE | 1:1 | 1½ hours, 60° C | 88 | Rubbery. |
| b | BO | PGE | 1:1 | do | 86 | Do. |
| c | PO | BO | 1:1 | 20° C | 100 | M.W. $1.2 \times 10^6$. |
| d | PO | AGE | 20:1 | 20° C | 93 | |
| e | BO | AGE | 20:1 | 20° C | 92 | M.W. $1.4 \times 10^6$. |
| f | PGE | AGE | 20:1 | 2 hours, 60° C | 64 | |

[1] Total amount of monomer = 150 mmol.

NOTE.—M.W. = molecular weight; PO = propylene oxide; BO = 1,2-butylene oxide; PGE = phenylglycidyl ether; AGE = allylglycidyl ether.

EXAMPLE IX 134 mg. of dibutylzinc (0.75 mmol[1]) and 387 mg. [(2-hydroxyethyl)thio] triphenyllead (0.75 mmol) were heated in 6 ml. of benzene for 1 hour at 80° C. in a nitrogen atmosphere. With this catalyst system some experiments were carried out, in each of them 8.7 g. of propylene oxide (150 mmols) being polymerized for different periods of time. The results are summarized in Table 2.

TABLE 2.—POLYMERIZATION OF PROPYLENE OXIDE IN BENZENE (Ratio PO/B = 1:1)

| Polymerization time | Yield, percent | Molecular weight | Crystallinity, percent |
|---|---|---|---|
| 3 hours | 100 | $1.8 \times 10^6$ | 81 |
| 1 hour | 100 | $2.3 \times 10^6$ | 86 |
| 30 minutes | 96 | $1.8 \times 10^6$ | 85 |
| 15 minutes | 86 | $2.0 \times 10^6$ | 85 |

EXAMPLE X

In three separate expreiments, ethylene oxide gas was passed into a suspension of the reaction product of diethylzinc and [(2-hydroxyethyl)thio] triphenyllead in benzene, prepared as in Example IX, at a temperature of 30° C. Thereafter, the reaction mixture was heated for some hours at 70° C., the escaping ethylene oxide, via a cooler, being refluxed into the reaction vessel that was filled with nitrogen. After standing overnight at ambient temperature, a methanolic antioxidant solution was added and the solvents removed in vacuum. Table 3 shows the results.

TABLE 3.—POLYMERIZATION OF ETHYLENE OXIDE IN BENZENE SOLVENT

| Catalyst conc. in mmol | | Conc. ethylene oxide, mmol | Ratio E.O/benzene | Yield, percent | Molecular weight[1] |
|---|---|---|---|---|---|
| ($Et_2Zn$) | ($Ph_3PbS$—$CH_2$—$CH_2$—OH) | | | | |
| 1.5 | 1.5 | 150 | 1:4 | 90 | 200,000 |
| 0.75 | 0.75 | 150 | 1:1 | 100 | 600,000 |
| 0.375 | 0.375 | 150 | 2:1 | 95 | 1,600,000 |

[1] Determined by viscosimetry in benzene at 25° C.

EXAMPLE XI 0.75 mmol of dibutylzinc in 10 ml. of dry benzene were mixed with 0.75 mmol [(2-hydroxyethyl)thio]triphenyllead and heated for 1 hour at 80° C. After centrifuging and washing with dry hexane, the precipitate was suspended in 140 ml. of hexane. At 25° C., 300 mmols of ethylene oxide was passed in whereupon the reaction mixture was stored overnight at room temperature. The polymeric mass was pulverized with hexane in a homemixer and filtrated. A white powder resulted which when dissolved in water gives a perfectly clear, highly viscous solution. Transparent foils could also be pressed at 100° C. The molecular weight, determined by viscosimetry, was approximately 1,300,000.

[1] Millimole(s).

EXAMPLE XII 387 mg. of [(2-hydroxyethyl)thio] triphenyllead and 93 mg. of diethylzinc in 4½ ml. of dry benzene were heated for 1 hour at 80° C. as described in Example VII. After cooling 17.6 g. of freshly distilled purified styrene oxide was added. After standing overnight at ambient temperature, the reaction product formed was treated with hexane and 13.2 g. of polymeric material was obtained. It was found that 45% of this was insoluble in acetone. From the insoluble polymer, clear colorless sheets could be pressed at 140° C.

EXAMPLE XIII

In the way described in Example XII, 418 mg. of [(2-hydroxyethyl)thio] tri p-tolyllead and 93 mg. of diethylzinc were heated. After cooling 10.5 ml. (8.7 g.) of propylene oxide was added. The mixture had completely gelated after 1 hour. After working up in the usual way, 8.4 g. of a rubbery white polymer was obtained.

EXAMPLE XIV 1.9 g. of [(2-hydroxyethyl)thio] triphenyllead and 0.46 g. of diethylzinc were heated for 1 hour at 90° C. in 50 ml. of benzene under exclusion of oxygen and water. After cooling the suspension was centrifuged, the precipitate washed once with 40 ml. of purified dry kerosine and centrifuged again. The precipitate was then transferred into a polymerization vessel having a volume of approximately 2 liters which was filled with nitrogen and in which there was 1 liter of kerosine (B.P. 45–110° C./17 mm.). The mixture was kept at 25° C. by means of a thermostat bath. While the aforesaid mixture was vigorously stirred, 105 ml. (87 g.) of propylene oxide was added. After some minutes, the inner temperature started rising, but was kept at approximately 30° C. A powdered polymer was produced. After 4 hours the polymeric material was filtered off and washed with petroleum ether (B.P. 60°–80° C.) to which some antioxidant had been added. The polymer was dried at ambient temperature. 72 g. (83% yield) of white, rubbery crumbly polypropylene oxide was obtained. The crystallinity amounted to 94% and the molecular weight 3,250,000. From the filtrates, approximately 10 g. of less crystalline polymer could still be obtained.

EXAMPLE XV

In four separate experiments, 0.75 mmol each of ethylzinc ethanolate, ethylzinc phenolate, ethylzinc diphenylamine and 0.25 mmol tris (ethylzinc) glycerolate was heated with 0.75 mmol of [(2-hydroxyethyl)thio] triphenyllead for 1 hour at 80° C. in 6 ml. of benzene in a nitrogen atmosphere. After cooling 150 mmols of propylene oxide was added. After standing overnight, each polymer formed was worked up in the usual way.

Table 4 gives the yields and the molecular weights obtained with the different catalyst systems.

TABLE 4

| RZnR' | Yield, percent | Molecular weight |
|---|---|---|
| Ethylzinc ethanolate | 82 | 1,450,000 |
| Ethylzinc phenolate | 100 | 750,000 |
| Tris (ethylzinc) glycerolate | 98 | 1,350,000 |
| Ethylzinc diphenylamine | 96 | 1,300,000 |

EXAMPLE XVI 0.9 g. (2 mmols) of triphenyllead hydroxide and 0.156 g. (2 mmols) of 2-mercaptoethanol were brought together in 15 ml. of benzene. A clear solution was produced. At ambient pressure 7.5 ml. of benzene was distilled off, the water formed being removed azeotropically. After cooling, the polymerization vessel was made oxygen-free by removal of the air by means of nitrogen. Now 0.24 g. (2 mmols) of diethylzinc dissolved in 5 ml. of benzene was added and the mixture was stirred for 2 hours at ambient temperature. After adding 23.2 g. (400 mmols) of propylene oxide in a short time a white rubbery polymer was obtained with a yield of 96%.

EXAMPLE XVII

Example XVI was repeated with 2-hydroxypropane-thiol-1. A white rubbery polymer was obtained in high yield. The molecular weight of the polymer was about $1-1.2 \times 10^6$ and the crystallinity was 66%.

EXAMPLE XVIII

Example XVI was repeated with 3-phenoxy-2-hydroxypropanethiol-1. A white rubbery polymer was obtained in high yield. The molecular weight of the polymer was about $1-1.2 \times 10^6$ and the crystallinity was 60%.

EXAMPLE XIX

In the way described in Example VII 397 mg. of [(2-hydroxypropyl) thio] triphenyllead and 92 mg. of diethylzinc were heated. After cooling, 10.5 ml. of propylene oxide was added. The mixture gelled within 1 hour. After working up in a conventional manner 8 g. of a white rubbery polymer was obtained. The crystallinity was about 63%.

Thus, according to the invention, a catalyst system and polymerization process for epoxides are provided whereby excellent yields of highly crystalline polymers are obtained. The high molecular weight polymers can be hot-pressed into thin films which can be stretched biaxially at room temperature. Films from polypropylene oxide can be made and used as shrink films. They show a high water vapor transmission. The polymer powders obtained with ethylene oxide which are water soluble are useful as thickeners and binders, as textile finishes, pharmaceutical and cosmetic preparations, in water treatment and as adhesives.

Various modifications and alternate embodiments of the present invention will readily suggest themselves to those skilled in the art upon study of the preceding specification. None of these variations or those disclosed are, however, intended to limit the scope of the invention as defined by the following claims.

We claim:
1. A catalyst system for polymerizing and copolymerizing epoxide monomers and mixtures thereof comprises a complex compound formed by reacting
   (a) a diorganozinc compound of the formula RZnR' wherein R is an unsubstituted alkyl radical having from 1 to 6 carbon atoms or an unsubstituted aryl radical having 6 to 8 carbon atoms and R' is the same as R or an alkoxy, aryloxy, or diarylamine radical, and
   (b) a triorganometal thiolate compound of the formula

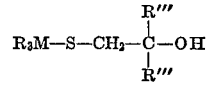

wherein R has the same meaning as above and R'' and R''' are each selected from the group of radicals consisting of hydrogen, methyl, hydroxymethyl, chloromethyl, alkyl radicals of the formula

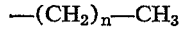

in which n may be 1 to 16, and unsubstituted phenyl, and M is silicon, germanium, tin or lead, and wherein said diorganozinc compound and said triorganometal thiolate compound are present in sufficient amounts such that the ratio of zinc to hydroxide is between 1:1 and 1:2.

2. A catalyst system according to claim 1 wherein M is lead or tin.

3. A catalyst system according to claim 1 wherein the diorganozinc compound is diethylzinc.

4. A catalyst system according to claim 1 wherein the diorganozinc compound is diphenylzinc.

5. A catalyst system according to claim 1 wherein the triorganometal thiolate compound is [(2-hydroxyethyl)thio] triphenyllead.

6. A process for preparing a catalyst system for polymerizing and copolymerizing epoxide monomers and mixtures thereof which comprises the steps of
(1) mixing in an inert, non-polar solvent (a) a diorganozinc compound of the formula RZnR' wherein R is an unsubstituted alkyl radical having from 1 to 6 carbon atoms or an unsubstituted aryl radical having 6 to 8 carbon atoms and R' is the same as R or an alkoxy, aryloxy, or diarylamine radical, with (b) a triorganolead thiolate compound of the formula

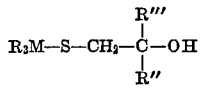

wherein R has the same meaning as above and R" and R''' are each selected from the group of radicals consisting of hydrogen, methyl, hydroxymethyl, chloromethyl, the alkyl radicals of the formula

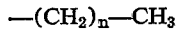

in which $n$ may be 1 to 16, and unsubstituted phenyl, and M is silicon, germanium, tin or lead, and wherein said diorganozinc compound and said triorganometal such that the ratio of zinc to hydroxide is between 1:1 and 1:2,
(2) reacting said diorganozinc and said triorganolead thiolate in an inert, dry atmosphere at a temperature ranging from 0° C. to 120° C., and
(3) isolating the resulting complex diorganozinc-thiolate precipitate with exclusion of air and moisture in an inert atmosphere.

7. A process according to claim 6 wherein said diorganic compound and said triorganolead thiolate compound are present in sufficient amounts such that the ratio of Zn:OH is about 1:1.

8. A process according to claim 6 wherein the reaction is carried out at a temperature ranging from 60° C. to 100° C.

9. A process according to claim 6 wherein the inert solvent is benzene.

10. A process according to claim 6 wherein the inert, dry atmosphere consists essentially of nitrogen.

11. A catalyst according to claim 1 wherein said diorganic compound and said triorganometal thiolate compound are present in sufficient amounts such that the ratio of zinc to hydroxide is about 1:1.

References Cited
UNITED STATES PATENTS

| | | | |
|---|---|---|---|
| 3,040,019 | 6/1962 | Joly et al. | 260—429.9 |
| 3,461,146 | 8/1969 | Turner et al. | 260—429.7 |
| 3,647,834 | 3/1972 | Martin | 260—429.9 |

WERTEN F. W. BELLAMY, Primary Examiner

U.S. Cl. X.R.

260—429, 429.7, 437, 448.2 R

PO-1050
(5/69)

UNITED STATES PATENT OFFICE
CERTIFICATE OF CORRECTION

Patent No. 3,798,249          Dated March 19, 1974

Inventor(s) Henricus G. J. Overmars et al.

It is certified that error appears in the above-identified patent and that said Letters Patent are hereby corrected as shown below:

Col. 3, line 48, change "trimethyl-1,4,6" to -- trimethyl-2,4,6 --;

Col. 4, line 20, change "10.38" to -- 1038 --;

Col. 8, line 43, after "thereof", insert -- which --;

Col. 9, line 26, after "triorganometal", insert -- thiolate compound are present in sufficient amounts --;

Col. 10, line 5, change "ganic" to -- ganozinc --;

Col. 10, line 16, change "ganic" to -- ganozinc --; and

Col. 10, line 22, change "3,040,019" to -- 3,040,079 --.

Signed and sealed this 1st day of October 1974.

(SEAL)
Attest:

McCOY M. GIBSON JR.           C. MARSHALL DANN
Attesting Officer           Commissioner of Patents

UNITED STATES PATENT OFFICE
CERTIFICATE OF CORRECTION

Patent No. 3,798,249             Dated March 19, 1974

Inventor(s) Henricus G. J. Overmars et al.

It is certified that error appears in the above-identified patent and that said Letters Patent are hereby corrected as shown below:

Column 8, line 56, "$R'''$" should read -- $R''$ --.

Signed and sealed this 7th day of January 1975.

(SEAL)
Attest:

McCOY M. GIBSON JR.                 C. MARSHALL DANN
Attesting Officer                   Commissioner of Patents